3,655,795
TRIMERIZATION OF BUTADIENE
David Lee Sullivan, Victoria, Tex., assignor to E. I. du Pont de Nemours and Company, Wilmington, Del.
No Drawing. Filed Jan. 11, 1971, Ser. No. 105,647
Int. Cl. C07c 3/18
U.S. Cl. 260—666 B    7 Claims

ABSTRACT OF THE DISCLOSURE

This invention relates to an improved process for the trimerization of butadiene to cyclododecatriene-(1,5,9) using a catalyst comprising an organoaluminum sesquichloride and a titanium compound wherein increased yield of the desired product and improved operability of the process are realized by recycling into the reaction zone at least a portion of the by-product 1,5-cyclooctadiene and 4-vinylcyclohexene from the trimerization reaction.

BACKGROUND OF THE INVENTION

The production of cyclododecatriene-(1,5,9) by subjecting butadiene to the action of various catalysts is known. Butadiene trimerization catalysts, based on alkylaluminum chlorides and titanium halides, such as those described in Schneider et al., U.S. Pat. No. 3,076,045, and Wilke U.S. Pat. No. 2,964,574, Koch et al. U.S. Pat. No. 3,381,045, Eleuterio et al. U.S. Pat. No. 3,381,047, and Brenner U.S. Pat. No. 3,344,199 are known. The use of solvents in the trimerization of butadiene is described in U.S. Pat. No. 3,420,899, in British Pat. No. 1,061,027 and in Canadian Pat. No. 810,719. In British Pat. No. 1,061,027 a decreased ability of the catalyst to form the desired cyclododecatriene is ascribed to build-up in concentration of by-product vinylcyclohexene in the recycled solvent. The back mixing of a part of the reaction product into the reaction mixture in the oligomerization of butadiene over a nickel complex catalyst is described in U.S. Pat. No. 3,272,876.

SUMMARY OF THE INVENTION

The present invention is an improvement over the above-mentioned processes in yield of 1,5,9-cyclododecatriene from butadiene and in operability of the process. The improvement comprises recycling into the reaction zone from 5 to 25 weight percent based on 1,5,9-cyclododecatriene of the by-products 1,5-cyclooctadiene and 4-vinylcyclohexene formed in the trimerization reaction. Since these by-products are normally removed in a subsequent refining step, their inclusion in the trimerization stream does not introduce a material which requires an additional step for removal after the reaction is completed. The catalyst system for the trimerization is prepared from certain hereinafter defined aluminum sesquichlorides and titanium compounds together with a promoter for the catalyst system selected from the group consisting of water, oxygenated organic compounds and either oxygen or oxygen containing gases or liquids. For convenience, the exact composition of the organometallic compound may be varied and described as any composition having the following ratio of composition:

$$Z_{(2.5-3.5)}Al_2Cl_{(3.5-2.5)}$$

wherein Z is selected from the class consisting of alkyl radicals containing from 2 to 4 carbon atoms and the phenyl radical. The molar ratio of the aluminum sesquichloride to promoter should be maintained at from 1/.05 to 1/1 when anhydrous butadiene is used as the starting material with from 1/0.2 to 1/0.6 being the especially preferred range.

As indicated above, the promoter for the catalyst system may be water, oxygenated compounds, oxygen or oxygen containing gases or liquids. The amount of water when used as a promoter is in the range of 0.3 to 0.9 mole per mole of aluminum compound. The amount of oxygen as oxygen gas or in an oxygen containing gas such as air is in the range of 0.1 to 0.7 mole per mole of aluminum compound. The amount of oxygen containing compound used is in the range of 0.05 to 1.0 mole per mole of the aluminum compound.

The oxygen containing compounds comprise aldehydes, ketones, epoxides, and anhydrides. The aldehydes suitable for use as a promoter have the structure RCHO where R is hydrogen or a hydrocarbon radical containing from 1 to 15 carbon atoms as stated in claim 1. The ketones suitable for use as promoters have the structure

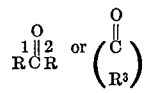

where $R^1$ is a phenyl or an alkyl radical of from 1 to 10 carbon atoms and $R^2$ is a phenyl or an alkyl radical of from 1 to 10 carbon atoms, and where $R^3$ is an alkylene radical of from 4 to 15 carbon atoms. Diketones having the formula

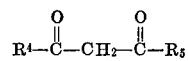

are also useful promoters. $R^4$ is an alkyl radical of from 1 to 10 carbon atoms and $R^5$ is an alkyl radical of from 1 to 10 carbon atoms. The epoxides suitable for use have the structure

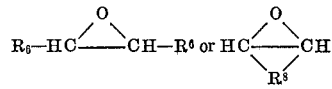

wherein $R^6$ is a hydrocarbon radical of from 1 to 10 carbon atoms and $R^7$ is a hydrocarbon radical of from 1 to 10 carbon atoms, and wherein $R^8$ is an alkylene radical containing from 6 to 20 carbon atoms. The anhydrides suitable for use in the present invention have the structure

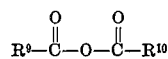

wherein $R^9$ is an alkyl radical of from 1 to 10 carbon atoms, and $R^{10}$ is an alkyl radical of from 1 to 10 carbon atoms.

If the recycled by-products contain oxygen or oxygenated organics, it is necessary to adjust the amount of promoter that is added with the catalyst to limit the total aluminum sesquichloride/promoter ratio to the prescribed ratio. Additionally, it is advantageous to remove peroxides present in the recycled by-products by eluting these by-products through activated alumina before their addition to the reactor. If the by-products are stored under nitrogen, it is not necessary to treat them with activated alumina. It is advisable, however, to determine the amount of water in these by-products as well as the presence of peroxide to assure trimerization equal to or below the aluminum sesquichloride/promoter ratio prescribed. The presence of oxygenated organic compounds can be determined from the infrared spectrum of the by-products. If oxygenated organics are present, it is again necessary to adjust the amount of promoter added together with the catalyst.

Although the by-products recycled to the trimerization reactor are predominantly 1,5-cyclooctadiene (COD) and 4-vinylcyclohexene (VCH), it is possible that other by-products are present also. Since the cyclododecatriene (CDDT) is separated from combined VCH/COD by distillation, other by-products with volatilities similar to VCH/COD may also be present.

In the catalytic trimerization of butadiene, the ratio of aluminum sesquichloride to titanium is not so critical. The molar ratio of the aluminum sesquichloride to titanium compound may be varied from 3/1 to 30/1 with ratios of from 5/1 to 15/1 being preferred. Higher ratios may be used but are not desirable because of the expense of the aluminum sesquichloride.

Generally speaking, any tetravalent titanium compound is operable in the present process as long as it is soluble in the reaction medium to an extent of at least 0.01 mole percent as based on CDDT at 20° C. and which does not contain a substituent that inactivates the aluminum sesquichloride catalyst. These compounds generally have the formula $TiA_4$ wherein A is selected from the class containing Cl, Br, I and OR, wherein R is a hydrocarbon radical of from 1 to 20 carbon atoms. The four A's used in a given titanium compound may be the same or different.

The catalyst may be prepared by reacting the promoter with the aluminum sesquichloride followed by reaction of the product so formed with the titanium compounds. However, for continuous operation, it is convenient to add all three catalyst components separately and simultaneously to the reaction vessel. If desired, all of the catalyst may be added as gases in separate butadiene streams as by vaporizing either the titanium compounds or the aluminum compound and adding the vapor to separate butadiene streams.

The present process is also applicable to the trimerization of substituted butadienes such as isoprene.

The butadiene trimerization reaction temperature generally is maintained at from 20° C. to 120° C. and preferably at from about 60° C. to about 90° C. At lower temperatures, the reaction rates become unduly slow and at higher temperatures increasing yield losses to by-products occur.

Pressure in the instant invention can be varied from ½ atm. to 50 atm. preferably at from 1 to 5 atm.

When carried out in a continuous manner, the reaction can be made to occur in multiple stages to take advantage of residual catalyst activity and the recycled by-product can be fed at any desired stage.

Cyclododecatriene is a valuable chemical intermediate which can be readily oxidized to succinic acid which is useful in the production of plastics such as polyamides. It also may be hydrogenated in known manner. Thus, cyclododecene or cyclododecane is obtained from cyclododecatriene. These hydrogenated products may, in turn, be oxidized in known manner to form the corresponding dicarboxylic acids.

DESCRIPTION OF THE PREFERRED EMBODIMENTS

In each of Examples I–V, a cylindrical reactor with a rounded bottom is used. The liquid volume of the reactor is 1500 ml. up to a side arm for discharge of the crude 1,5,9-cyclododecatriene (CDDT) made during steady state operation. The reactor is equipped with a paddle stirrer and internal cooling coils through which water is circulated to control the temperature of the reaction medium. Temperature is monitored by a thermocouple connected to a transformer which activates a solenoid valve controlling the cooling water flow through the coils. The temperature is held at 75° C.±1° C. Off gas from the reactor is passed through a condenser, then to a mercury seal which is used to regulate pressure. In each of the examples the reactor is charged with CDDT and the temperature is raised to 75° C. while simultaneously injecting ca. 0.002 mole $TiCl_4$ and 0.03 mole aluminum sesquichloride. The CDDT is sparged with butadiene as the catalysts are added. After the reaction starts, as evidenced by butadiene consumption, the catalyst ratios are adjusted and water is incrementally increased until all three catalyst components are added in the molar ratios shown in the examples. The addition of combined 4-vinylcyclohexene and 1,5-cyclooctadiene (VCH and COD) or either compound is then started and rapidly increased until the amount indicated in the examples is being continually added to the reactor. The crude CDDT obtained during steady state operation overflows through the side arm and fills a second 1500 ml. reactor. Additional butadiene is consumed in this second stirred reactor as this gas is sparged into the crude product collected from the first reactor. Product obtained from the second reactor is collected continuously and the catalyst in the crude reaction product is deactivated by saturation with anhydrous $NH_3$.

The average rate of reaction throughout a run is expressed as the number of grams/liter of reactor space/hour (g./l./hr.) of crude product of the analysis shown that were actually obtained. The amount of by-product added is not included in this number so that productivity is expressed on a net basis. In all cases the yield to CDDT is about 2–3% higher when VCH/COD is injected as compared with steady state yield obtained without by-product addition. In Example V for instance, the average yield of CDT without by-product addition is 86.5% while the average yield of CDDT is 89.1% when combined by-products are added. This is seen in the examples where addition of 6–16 wt. percent by-products, based on steady-state productivity of crude CDDT, resulted in an average CDDT yield of 89.1%. The addition of COD only results in nearly a 2% net CDDT yield increase which is slightly less than the 2.6% net yield increase obtained with injection of combined VCH/COD. Best results on yield improvement of CDDT and in general operability of the process are realized when the amount of by-product added is in the range of about 10 to about 20 percent, based on CDDT produced.

TABLE I.—SYNTHESIS OF CDDT FROM BUTADIENE IN THE PRESENCE OF RECYCLED VCH AND/OR COD [1]

| Example | I | II | III | IV | V |
|---|---|---|---|---|---|
| Molar catalyst ratio (($C_2H_5)_3Al_2Cl_3/TiCl_4/H_2O$) | 10/1/5 | 11/1/5 | 10/1/4 | 10/1/4 | 10/1/4 |
| Steady state productivity (g. crude CDDT/l. reactor space/hr.) | 970 | 890 | 780 | 670 | 875 |
| $TiCl_4$ concentration (g./ml. cyclohexane) | 0.0286 | 0.0546 | 0.0555 | 0.0555 | 0.0452 |
| Catalyst feed rate (g./l./hr.) | 1.0 | 1.0 | 1.0 | 1.0 | 1.0 |
| By-product(s) fed to reactor | COD | [4] VCH/COD (28/72) | [3] VCH/COD (35/65) | [3] VCH/COD (35/65) | None |
| Amount of by-product fed (wt. percent based on steady productivity of crude CDDT) | 7.3 | 6.8 | 13 | 16 | |
| Percent distribution in crude: [2] | | | | | |
| CDDT | 88.4 | 88.6 | 89.7 | 89.1 | 86.50 |
| VCH and COD | 4.20 | 4.90 | 1.30 | 1.80 | 7.56 |
| Non-volatile residue | 7.40 | 6.50 | 9.00 | 9.1 | 5.94 |

[1] Temperature, 75° C.; pressure 1.5 p.s.i.g.
[2] Results obtained by subtracting amounts of VCH and/or COD injected from amounts present in the crude product to yield net dimer production.
[3] Not treated with activated alumina.
[4] Treated with activated alumina.

I claim:

1. In a continuous process for the production of 1,5,9-cyclododecatriene which comprises contacting butadiene in a reactor with a catalyst system formed by mixing an aluminum compound of the structure $$Z_{(2.5-3.5)}Al_2Cl_{(3.5-2.5)}$$

wherein Z is selected from the class consisting of alkyl radicals containing from 2 to 4 carbon atoms and the phenyl radical; a titanium compound of the formula $TiA_4$ wherein A is selected from the class consisting of Cl, Br, I and OR wherein R is an organic radical of from 1 to 20 carbon atoms, in an amount such that the molar ratio of the aluminum compound to the titanium compound is maintained at from 3/1 to 30/1; and a promoter for the catalyst system wherein the promoter is selected from the group consisting of water in an amount of 0.3 to 0.9 mole per mole of aluminum compound, oxygen in an amount of 0.1 to 0.7 mole per mole of aluminum compound and oxygen containing compounds in an amount of 0.05 to 1.0 mole per mole of aluminum compound, wherein the oxygen containing compound is of the class consisting of compounds of the structures RCHO,

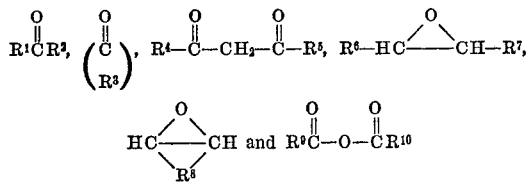

wherein R is hydrogen or an alkyl radical of from 1 to 15 carbon atoms, $R^1$ is a phenyl radical or an alkyl radical of from 1 to 10 carbon atoms, $R^2$ is a phenyl radical or a hydrocarbon radical of from 1 to 10 carbon atoms, $R^3$ is an alkylene radical of from 4 to 15 carbon atoms $R^4$ is an alkyl radical of from 1 to 10 carbon atoms, $R^5$ is an alkyl radical of from 1 to 10 carbon atoms, $R^6$ is an alkyl radical of from 1 to 10 carbon atoms, $R^7$ is an alkyl radical of from 1 to 10 carbon atoms, $R^8$ is an alkylene radical of from 6 to 10 carbon atoms, $R^9$ is an alkyl radical of from 1 to 10 carbon atoms and $R^{10}$ is an alkyl radical of from 1 to 10 carbon atoms; at a temperature in the range of 20 to 120° C. and at a pressure of 0.5 to 50 atmospheres and recovering cyclododecatriene-1,5,9 along with by-products 1,5-cyclooctadiene and 4-vinylcyclohexene; the improvement which comprises recycling into the reactor from 5 to 25 weight percent, based on the weight of 1,5,9-cyclododecatriene produced, of at least one of the by-products.

2. The process of claim 1 wherein the molar ratio of the aluminum compound to the titanium compound is from 5/1 to 15/1.

3. The process of claim 2 wherein the aluminum compound is ethylaluminum sesquichloride.

4. The process of claim 3 wherein the titanium compound is titanium tetrachloride.

5. The process of claim 2 wherein the by-product recycled to the reactor is 1,5-cyclooctadiene.

6. The process of claim 2 wherein the by-product recycled to the reactor comprises 1,5-cyclooctadiene and 4-vinylcyclohexene.

7. The process of claim 1 wherein the amount of by-product recycled into the reactor is in the range of about 10 weight percent to about 20 weight percent, based on 1,5,9-cyclododecatriene produced.

References Cited
UNITED STATES PATENTS 3,381,045  4/1968  Koch et al. _____ 260—666 B
3,381,047  4/1968  Eleuterio et al. ____ 260—666 B
3,523,980  8/1970  Sullivan _____ 260—666 B
3,272,876  9/1966  Levine _____ 260—666 B DELBERT E. GANTZ, Primary Examiner V. O'KEEFE, Assistant Examiner